United States Patent
Hung

(10) Patent No.: US 7,899,163 B2
(45) Date of Patent: Mar. 1, 2011

(54) XDSL MODEM AND METHOD FOR STABILIZING XDSL OPERATION THEREOF

(75) Inventor: Kuo-Wei Hung, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1237 days.

(21) Appl. No.: 11/309,479

(22) Filed: Aug. 11, 2006

(65) Prior Publication Data
US 2007/0121864 A1    May 31, 2007

(30) Foreign Application Priority Data
Nov. 18, 2005   (TW) ............................... 94140642 A

(51) Int. Cl.
*H04M 11/00* (2006.01)

(52) U.S. Cl. .................. 379/93.01; 379/90.01; 379/93.31

(58) Field of Classification Search ............... 379/93.01, 379/93.29, 93.28, 93.31, 93.33, 93.09; 370/352; 375/222
See application file for complete search history.

(56) References Cited

U.S. PATENT DOCUMENTS

| | | | | |
|---|---|---|---|---|
| 3,644,896 | A * | 2/1972 | Chaddha | 375/222 |
| 5,771,467 | A * | 6/1998 | Sato | 455/557 |
| 5,790,608 | A * | 8/1998 | Benayoun et al. | 375/356 |
| 6,252,900 | B1 | 6/2001 | Liu et al. | |
| 6,269,154 | B1 | 7/2001 | Chellali et al. | |
| 7,133,441 | B1 * | 11/2006 | Barlev et al. | 375/222 |
| 7,313,231 | B2 * | 12/2007 | Reid | 379/221.01 |

* cited by examiner

*Primary Examiner* — Melur Ramakrishnaiah
(74) *Attorney, Agent, or Firm* — Wei Te Chung

(57) ABSTRACT

A method for stabilizing a connection between an xDSL modem (160) and a central office (120) is provided. The method includes detecting whether a signal on a telephone line is a ring signal; setting a ring signal flag if the signal on the telephone line is the ring signal; and maintaining a connection between the xDSL modem and the central office. An xDSL modem using the method is also provided.

10 Claims, 2 Drawing Sheets

XDSL MODEM AND METHOD FOR STABILIZING XDSL OPERATION THEREOF

FIELD OF THE INVENTION

The present invention relates to customer premise equipment (CPE), and particularly to customer premise equipment such as a modem.

RELATED OF PRIOR ART

A ring signal detection circuit is commonly used in an x digital subscriber line (xDSL) modem integrated with a voice over IP (VoIP) phone, for detecting ring signals. Typically, when a ring signal comes in, a connection between the xDSL modem and a central office (CO) may be prone to be interrupted due to absence or poor quality of a splitter. At this point, the XDSL modem has to reconnect to the CO, wasting approximately 60 seconds of time.

Therefore, a heretofore unaddressed need exists in the industry to overcome the aforementioned deficiencies and inadequacies.

SUMMARY OF THE INVENTION

An xDSL modem for stabilizing a connection with a CO is provided. The xDSL modem is connected to the CO via a public switched telephone network. The xDSL modem includes a ring signal detection module and a setting module. The ring signal detection module is used for detecting whether a signal on a telephone line is a ring signal or noise. The setting module is used for setting a ring signal flag if the signal on the telephone line is the ring signal, and maintaining a connection between the xDSL modem and the CO.

A method for stabilizing a connection between an xDSL modem and a CO is provided. The method includes detecting whether a signal on a telephone line is a ring signal; setting a ring signal flag if the signal on the telephone line is the ring signal; and maintaining a connection between the xDSL modem and the CO.

Other objectives, advantages and novel features of the present invention will be drawn from the following detailed description of preferred embodiments of the present invention with the attached drawings, in which:

DETAILED DESCRIPTION OF THE INVENTION

Figure 1:
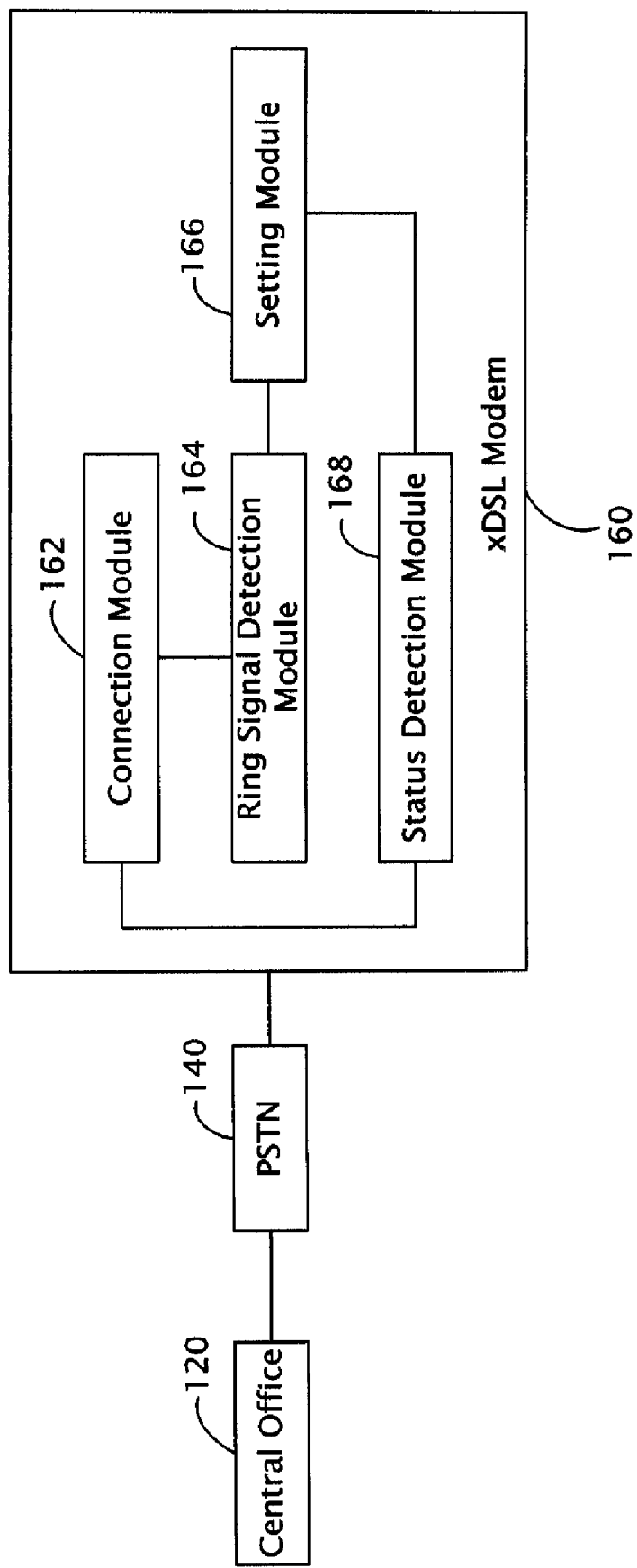
FIG. 1 is a schematic diagram illustrating an application environment of an xDSL modem in accordance with an exemplary of the present invention.

FIG. 1 is a schematic diagram illustrating an application environment of an xDSL modem 160 of an exemplary embodiment of the present invention.

The xDSL modem 160 is connected to a central office (CO) 120 via a Public Switched Telephone Network (PSTN) 140. The CO 120 is a digital subscriber line access multiplexer (DSLAM). The xDSL modem 160 includes a connection module 162, a ring signal detection module 164, a setting module 166, and a status detection module 168.

The connection module 162 is used for connecting to the CO 120 via the PSTN 140. In this exemplary embodiment, the connection module 162 connects to the CO 120 based on the G.992.X standards of the International Telecommunication Union.

The ring signal detection module 164 detects whether a signal on a telephone line is a ring signal, and sends a detection result to the setting module 166. The detection result indicates whether the signal is the ring signal or not.

The setting module 166 is used for setting a ring signal flag or a non-ring signal flag according to the detection result. In this exemplary embodiment, the setting module 166 sets the ring signal flag if the signal is the ring signal, and sets the non-ring signal flag if the signal is not the ring signal. The setting module 166 is further used for canceling the ring signal flag after the ring signal is no longer detected on the telephone line.

The status detection module 168 is used for detecting a connection status between the xDSL modem 160 and the CO 120 and determines whether the connection between the XDSL modem 160 and the CO 120 is to be maintained. After setting the non-ring signal flag, the status detection module 168 detects the connection status between the xDSL modem 160 and the CO 120.

In this exemplary embodiment, the status detection module 168 detects the connection status by detecting a bit error rate (BER) of a physical layer, and determines whether the connection is to be maintained by verifying whether the BER exceeds a threshold, which is, for example, 100 cyclic redundancy codes (CRCs) generated in the physical layer per second defined by the G.99x standard. The BER of the physical layer includes a CRC and a head error check (HEC).

Figure 2:
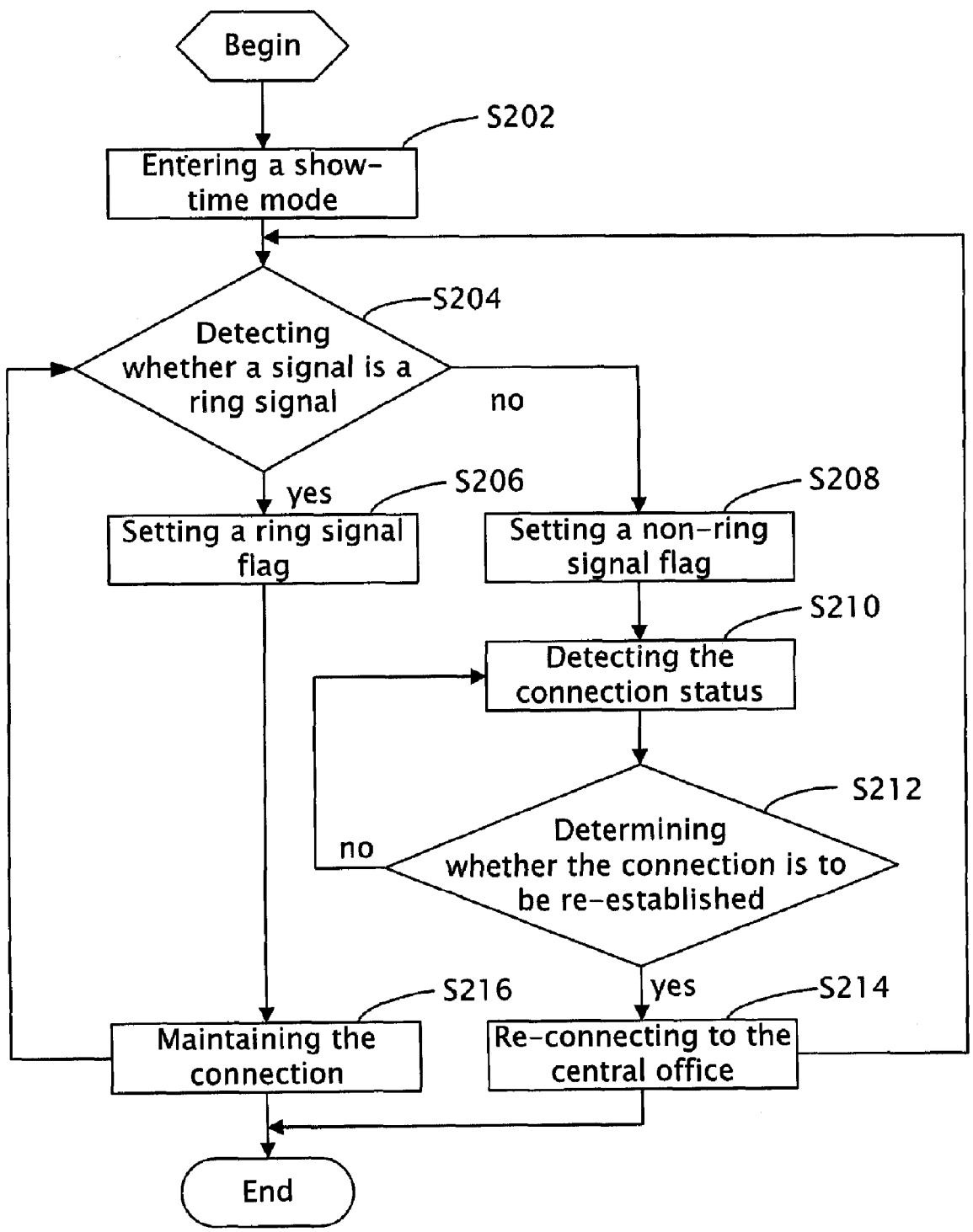
FIG. 2 is a flowchart of stabilizing a connection between a CO and the xDSL modem in accordance with another exemplary embodiment of the present invention.

FIG. 2 is a flowchart of stabilizing a connection between the CO 120 the xDSL modem 160 of the exemplary embodiment of the invention.

In step S202, the xDSL modem 1 60 and the CO 120 enter a show-time mode.

In detail, the connection module 162 determines whether the CO 120 is ready for communicating via a handshake protocol. If the CO 120 is ready for communicating, the connection module 162 detects a distance between the xDSL modem 160 and the CO 120 by performing transceiver training. Upon performing the transceiver training, a connection between the CO 120 and the xDSL modem 160 is setup. Then the connection module 162 performs channel analysis and message exchange to determine data traffic between the xDSL modem 160 and the CO 120. After the data traffic is successfully determined, the xDSL modem 160 and the CO 120 enter the show-time mode.

In step S204, the ring signal detection module 164 determines whether a signal on the telephone line is the ring signal.

In this exemplary embodiment, the ring signal detection module 164 has a preset reference voltage such as 35V, then detects a voltage of the telephone line. The detection module 164 then compares the reference voltage with the voltage of the telephone line.

If the voltage of the telephone line exceeds the reference voltage, then presence of the ring signal is indicated. The ring signal detection module 164 sends a detection result to the setting module 166. The process then proceeds to step S206 described below.

If the reference voltage is less than the voltage of the telephone line, that indicates the signal is not the ring signal and considered noise. The ring signal detection module 164 sends the detection result to the setting module 166. The process then proceeds to step S208 described below.

In step S206, the setting module 166 sets the ring signal flag. The process then proceeds to step S216, where the connection between the xDSL modem 160 and the CO 120 is maintained. After the ring signal disappears, the setting module 166 cancels the ring signal flag. The process then returns to step S204.

In this exemplary embodiment, the ring signal flag is represented by number "1". If the ring signal flag is set to 1, it indicates a splitter is not present in the xDSL modem 160, or the splitter is of poor quality.

In step S208, the setting module 166 sets the non-ring signal flag. In this exemplary embodiment, the non-ring signal flag is represented by the number "0". The process then proceeds to step S210.

In step S210, the status detection module 168 detects the connection status between the xDSL modem 160 and the CO 120. In this exemplary embodiment, the status detection module 168 detects the connection status by detecting the BER of the physical layer. The process then proceeds to step S212.

In step S212, the status detection module 168 determines whether the connection is to be re-established based on the connection status between the xDSL modem 160 and the CO 120. In this exemplary embodiment, the status detection module 168 verifies whether the BER exceeds a threshold defined by the G.99x standard in order to determine whether the connection is to be maintained. For example, the threshold may be 100 CRCs generated in the physical layer per second. If the BER exceeds the threshold, that indicates a noise signal is generated on the telephone line. The process then proceeds to step S214.

In step S214 the connection is re-established by re-connecting the xDSL modem 160 to the CO 120 at a lower BER. The process then returns to step S204 to determine whether the signal on the telephone line is the ring signal. If the BER does not exceed the threshold, it indicates the signal is a ring signal. The process returns to step S210.

In step S216 the connection is maintained directly without any further detection to the connection between the xDSL modem 160 and the CO 120.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An xDSL modem connected to a central office, comprising:
   a ring signal detection module for detecting whether a signal on a telephone line is a ring signal;
   a setting module for setting a ring signal flag if the signal on the telephone line is the ring signal, and maintaining a connection between the xDSL modem and the central office, and further for setting a non-ring signal flag if the signal is not the ring signal; and
   a status detection module for detecting a connection status between the xDSL modem and the central office after the setting module sets the non-ring signal;
   wherein the status detection module further detects a bit error rate (BER) of a physical layer, and verifies whether the BER exceeds a threshold to determine whether the connection is to be maintained.

2. The xDSL modem as recited in claim 1, further comprising a connection module for connecting to the central office via a public switched telephone network.

3. The xDSL modem as recited in claim 1, wherein the bit error rate of the physical layer comprises a cyclic redundancy code.

4. The xDSL modem as recited in claim 1, wherein the bit error rate of the physical layer comprises a head error check.

5. The xDSL modem as recited in claim 1, wherein the ring signal detection module is further used for sending a detection result to the setting module.

6. The xDSL modem as recited in claim 1, wherein the setting module is further used for canceling the ring signal flag when the ring signal is no longer detected on the telephone line.

7. A method for stabilizing a connection between an xDSL modem and a central office, comprising:
   detecting whether a signal on a telephone line is a ring signal;
   setting a ring signal flag if the signal on the telephone line is the ring signal;
   maintaining a connection between the xDSL modem and the central office;
   setting a non-ring signal flag if the signal is not the ring signal;
   detecting a connection status between the xDSL modem and the central office, comprising detecting a bit error rate of a physical layer; and
   determining whether the connection is to be maintained after detecting the connection status between the xDSL modem and the central office.

8. The method as recited in claim 7, further comprising a step of connecting to the central office via a public switched telephone network.

9. The method as recited in claim 7, further comprising a step of disconnecting and re-connecting to the central office if the bit error rate exceeds a threshold.

10. The method as recited in claim 9, further comprising a step of continuing to detect the bit error rate of the physical layer if the bit error rate is less than the threshold.

* * * * *